(12) United States Patent
Cipullo et al.

(10) Patent No.: US 10,551,237 B2
(45) Date of Patent: Feb. 4, 2020

(54) MEASURING FUEL IN A FUEL TANK (71) Applicants: AIRBUS OPERATIONS LIMITED, Bristol (GB); ASTON UNIVERSITY, Birmingham (GB)

(72) Inventors: Alessio Cipullo, Bristol (GB); Neil Thomson Gordon, Birmingham (GB); Kaiming Zhou, Birmingham (GB)

(73) Assignees: AIRBUS OPERATIONS LIMITED, Bristol (GB); ASTON UNIVERSITY, Birmingham (GB)

( * ) Notice: Subject to any disclaimer, the term of this patent is extended or adjusted under 35 U.S.C. 154(b) by 165 days.

(21) Appl. No.: 15/726,771

(22) Filed: Oct. 6, 2017

(65) Prior Publication Data
US 2018/0100755 A1    Apr. 12, 2018

(30) Foreign Application Priority Data
Oct. 10, 2016 (GB) .................................. 1617139.9

(51) Int. Cl.
*G01B 11/06* (2006.01)
*G01F 23/292* (2006.01)

(52) U.S. Cl.
CPC ...... *G01F 23/2928* (2013.01); *G01B 11/0608* (2013.01)

(58) Field of Classification Search
CPC .............. G01F 23/2928; G01F 23/0092; G01F 23/292; G06T 7/00; G01B 9/02091; G01B 11/0608
See application file for complete search history.

(56) References Cited

U.S. PATENT DOCUMENTS

| 4,524,282 | A  |   | 6/1985  | King |
|-----------|----|---|---------|------|
| 6,626,038 | B1 |   | 9/2003  | Carsella et al. |
| 6,782,122 | B1 |   | 8/2004  | Kline et al. |
| 2010/0322462 | A1 | | 12/2010 | Wu et al. |
| 2014/0204390 | A1 | | 7/2014  | Fedosejevs et al. |
| 2015/0153212 | A1 | * | 6/2015 | Cipullo .............. G01F 23/292 382/203 |
| 2016/0341591 | A1 | | 11/2016 | Cipullo et al. |

(Continued)

FOREIGN PATENT DOCUMENTS

| CN | 104 677 860 | 6/2015 |
| DE | 10 2004 053 645 | 5/2006 |

(Continued)

OTHER PUBLICATIONS

Combined Search and Examination Report for GB1617139.9 dated Mar. 1, 2017, 6 pages.

(Continued)

*Primary Examiner* — Tony Ko
(74) *Attorney, Agent, or Firm* — Nixon & Vanderhye, P.C.

(57) ABSTRACT

A method of measuring a height of a fuel in an aircraft fuel tank (21)*b* including illuminating the fuel in the aircraft fuel tank and detecting reflected light from the fuel. Optical coherence tomography is used to determine the height of a surface of fuel in the fuel tank. An apparatus (30) is used to measure a height of a surface of fuel in an aircraft fuel tank, and an aircraft fuel tank system with a fuel tank and an apparatus for measuring a height of a surface of fuel in the aircraft fuel tank.

24 Claims, 5 Drawing Sheets

(56) References Cited

U.S. PATENT DOCUMENTS

2017/0003157 A1    1/2017  Cipullo et al.

FOREIGN PATENT DOCUMENTS

DE   10 2015 204 675   9/2016
WO   WO 2016/025278    2/2016

OTHER PUBLICATIONS

Huang et al., "Optical Coherence Tomography", Science, New Series, vol. 254, No. 5035, (Nov. 22, 1991), pp. 1178-1181.
European Search Report cited in 17 18 8642 dated Feb. 19, 2018, 9 pages.
C. Vazquez et al., "Multi-Sensor System for Level Measurements With Optical Fibres", IEEE, vol. Conf. 28, Nov. 5, 2002, 6 pages.

* cited by examiner

MEASURING FUEL IN A FUEL TANK

RELATED APPLICATION

This application claims priority to United Kingdom (GB) 1617139.9 filed 10 Oct. 2016, the entire contents of which is incorporated by reference.

FIELD OF THE INVENTION

The present invention relates to a method of determining a height of a fuel in an aircraft fuel tank. The present invention also relates to apparatus for determining a height of a surface of fuel in an aircraft fuel tank, and an aircraft fuel tank system with a fuel tank, and an apparatus for determining a height of a surface of fuel in the aircraft fuel tank.

BACKGROUND OF THE INVENTION

U.S. Pat. No. 6,782,122 describes apparatus for measuring height of a surface of liquid in a container utilizing a light source and camera pair disposed above the liquid surface in a predetermined spatial relationship to each other and the container. The light source illuminates the liquid surface with a light pattern and the camera captures the area image of the light pattern in a form of discrete picture elements (pixels) that are processed in an image processor to determine the height of liquid in the container. In another embodiment, the pixels of the area image are further processed to determine attitude of the liquid surface so that the processor may determine the quantity of liquid in the container based on the determined height and attitude of the liquid surface and container geometry data stored in a memory thereof.

SUMMARY OF THE INVENTION

According to one aspect of the present invention, there is provided a method of determining a height of a fuel in an aircraft fuel tank, the method comprising illuminating the fuel in the aircraft fuel tank, detecting reflected light from the fuel, and using optical coherence tomography (OCT) to determine the height of a surface of fuel in the fuel tank. The fuel may be liquid fuel.

With this arrangement it is possible to determine the height of fuel in a fuel tank without equipment entering the fuel tank boundary. Therefore, there is no requirement to provide in-tank equipment which aids assembly and maintenance.

The use of OCT provides for determination of the height of the boundaries of stratified layers of fluid. In particular, a determination of water layer in the fuel tank may be made.

The method may comprise using optical coherence tomography to determine a depth profile of fluid in the fuel tank, and determining the height of liquid fuel in the fuel tank in dependence on the determined depth profile.

The method may comprise analysing the depth profile to identify a gas/liquid boundary in the fuel tank, and determining the height of liquid fuel in the fuel tank in dependence on the determined gas/liquid boundary.

Therefore, the height of the top surface of fuel in the fuel tank may be easily determined.

The method may comprise analysing the depth profile to identify a tank/liquid boundary, and determining the height of liquid fuel in the fuel tank in dependence on the determined gas/liquid boundary and the tank/liquid boundary.

As such, the height of fuel in the fuel tank may be easily determined relative to a determined position of part of the fuel tank.

The method may comprise analysing the depth profile to identify a liquid fuel/water boundary, and determining the height of liquid fuel in the fuel tank in dependence on the determined gas/liquid boundary and the liquid fuel/water boundary.

Therefore, the height of liquid fuel in the fuel tank may be determined taking into account the height of stratified water in the fuel tank.

The method may comprise determining an interference spectrum pattern in the wavelength domain of the reflected light, and analysing the interference spectrum pattern to determine the depth profile of fluid in the fuel tank.

The method may comprise applying a Fast Fourier Transform to the interference spectrum pattern to determine the depth profile of fluid in the fuel tank.

The method may comprise directing light from a light source along a sample path into the fuel tank to illuminate the fuel and directing reflected light from the fuel tank to an optical detector.

The method may comprise directing light from the light source along a reference path split from the sample path, and recombining the light from the reference path with reflected light from the fuel tank to generate the interference spectrum pattern.

As such, the interference spectrum pattern may be easily generated.

The method may comprise using a swept laser source as the light source and a photodetector as the detector. With this arrangement the optical arrangement may be simplified.

The method may comprise using a broadband light source as the light source and a spectrometer as the detector.

The method may comprise directing light for illuminating the fuel in the aircraft fuel tank at a reflector disposed at an opposing wall of the fuel tank to a projection of light illuminating the fuel in the fuel tank.

This helps to maximise the accuracy of the determined depth profile.

The method may comprise directing light illuminating the fuel in the fuel tank from a bottom side of the fuel tank.

The method may comprise directing light illuminating the fuel in the fuel tank through a collimating lens prior to illuminating the fuel in the fuel tank.

With this arrangement, it is possible to illuminate light over a broad area whilst maximising the reflected light that is detected.

The method may comprise splitting light illuminating the fuel in the fuel tank into two or more projecting paths in the fuel tank, and determining a depth profile of fluid in the fuel tank at two or more positions in the fuel tank.

The method may comprise directing light through two or more substantially parallel fibre channels to split the light illuminating the fuel in the fuel tank into two or more projecting paths in the fuel tank.

The method may comprise scanning light illuminating the fuel in the fuel tank across a portion of the fuel tank, and determining a depth profile of fluid in the fuel tank at two or more positions in the fuel tank.

The method may comprise determining the attitude of a surface of fuel in the fuel tank in dependence on the two or more depth profiles of fluid in the fuel tank at two or more positions in the fuel tank.

According to another aspect of the present invention, there is provided an apparatus for measuring a height of a surface of fuel in an aircraft fuel tank, the apparatus comprising an optical coherence tomography system including a light source configured to illuminate the fuel in the aircraft fuel tank, a detector configured to detect reflected light from the aircraft fuel tank, and wherein the optical coherence tomography system is configured to analyse the reflected light using optical coherence tomography to determine the height of a surface of fuel in the fuel tank. The fuel may be a liquid fuel.

The apparatus may comprise a display device arranged to receive and display an output from the optical coherence tomography system.

According to another aspect of the present invention, there is provided an aircraft fuel tank system comprising a fuel tank, and apparatus for measuring a height of a surface of fuel in the aircraft fuel tank as recited above.

The fuel tank may comprise a window, and the optical coherence tomography system may be positioned outside the fuel tank and arranged to illuminate the fuel and detect reflect light through the window.

The fuel tank may comprise a reflector in the fuel tank which is configured to reflect light illuminating the fuel in the fuel tank.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
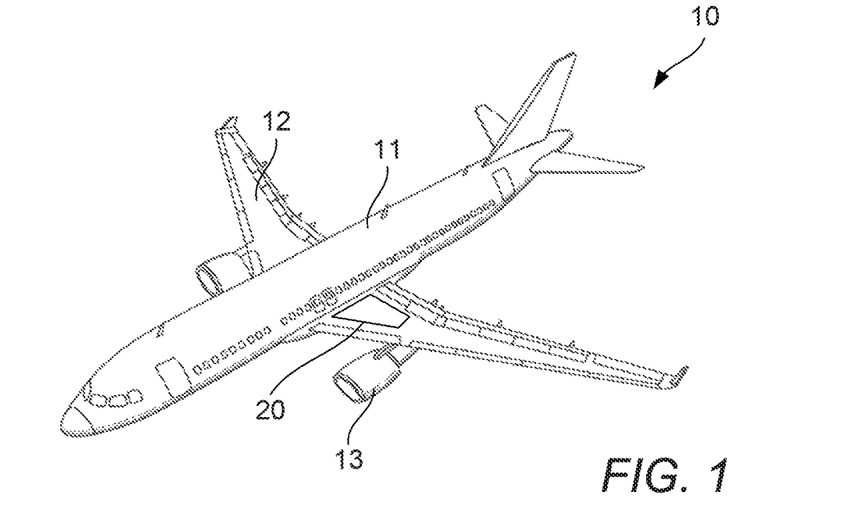
FIG. 1 shows an aircraft with a fuel tank system having an aircraft fuel tank.

FIG. 1 shows an aircraft 10. The aircraft 10 has a fuselage 11 carrying a pair of wings 12. Each wing 12 has an engine 13. The aircraft 10 has a fuel tank system 20. The fuel tank system 20 is configured to supply fuel to the engines 13.

Fuel for each engine 13 is stored in one or more aircraft fuel tanks of the tank system 20. Fuel may be stored in a centre tank within the fuselage 13 and one or more wing tanks within the wings 12. The description below refers to an aircraft fuel tank 21, which could equally refer to the centre tank, any of the wing tanks, an externally mounted tank, or an alternative fuel tank arrangement.

Figure 2:
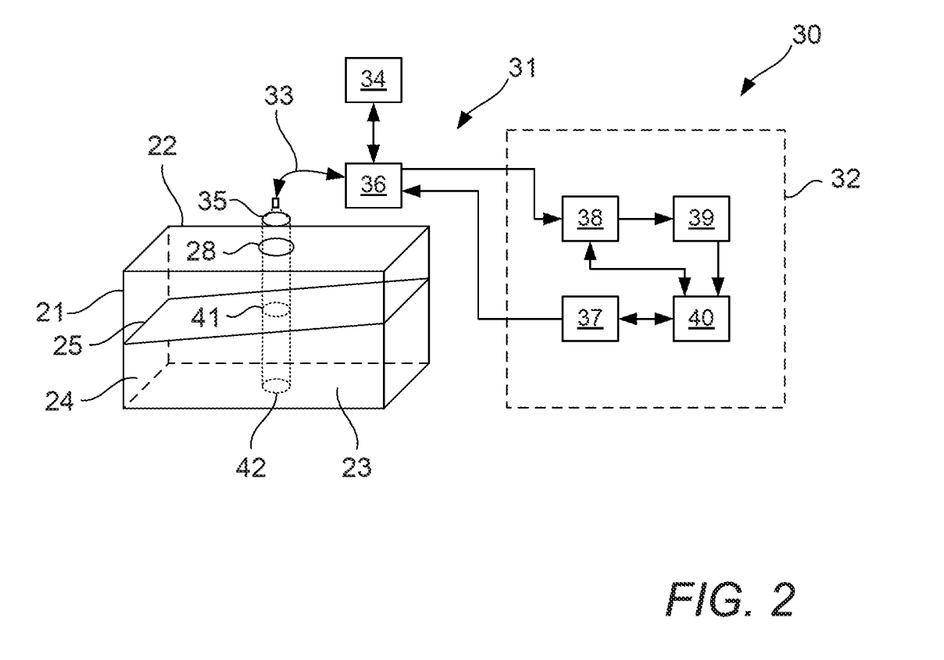
FIG. 2 shows the aircraft fuel tank of FIG. 1 and an optical coherence tomography based system for measuring fuel in the fuel tank.

FIG. 2 is a schematic view of an aircraft fuel tank system 20 comprising the fuel tank 21, and an optical coherence tomography (OCT) system 30 for measuring fluid boundaries in the fuel tank.

The fuel tank 21 is shown schematically with a parallelepiped structure with a top wall 22 and a bottom wall 23, front and rear walls, left and right side walls. Fuel 24 is received in the fuel tank 21. The fuel 24 is typically a liquid fuel, such as kerosene. The fuel 24 partially fills the fuel tank 21. An upper section of the fuel tank 21 does not contain liquid fuel 24 and is typically filled by atmospheric air or an inert gas. An upper surface 25 of the fuel 24 is defined at a liquid fuel/air boundary.

Figure 3:
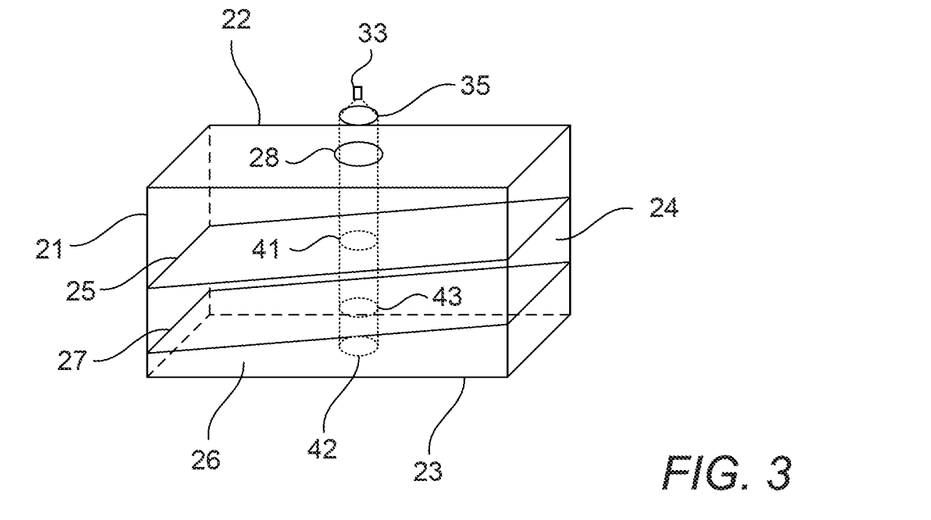
FIG. 3 is an enlarged view of the fuel tank of FIG. 1 showing transitions between two stratified liquids in the fuel tank.

As shown in FIG. 3, the fuel tank 21 may also contain a quantity of liquid water 26. As liquid water 26 has a greater density than liquid fuel 24, the liquid water 26 and liquid fuel 24 tend to form stratified layers. As such, a stratified liquid boundary 27 is defined at a liquid water/liquid fuel boundary. The bottom wall 23 defines a lower tank/liquid boundary.

An optical access window 28 is formed in the top wall 22 of the fuel tank 21. The optical access window 28 is disposed in a position where the wall 25 is not normally covered in fuel. The window 28 has hydrophobic coatings to minimise problems with condensation, fog, frost and microbial growth, although the coatings may be omitted.

The OCT system 30 comprises a system configured to perform an optical coherence tomography (OCT) method on the contents of the fuel tank 20. Optical coherence tomography (OCT) is an optical signal acquisition and processing method based on the principle of optical interferometry. It is typically applied to capture micrometre-resolution, 3D images from within optical scattering media, principally medical applications.

"Optical Coherence Tomography", D. Huang et al, Science, 22 Nov. 1991, vol. 254, no. 5035, pp. 1178-81, included by reference herein, demonstrated that OCT provides non-invasive cross-sectional imaging based on the principle of interferometry from within optical scattering media.

The OCT system 30 comprises an optical section 31. The OCT system 30 also comprises an acquisition and elaboration section 32. The acquisition and elaboration section 32 is configured to receive and process signals from the optical section 31. The optical section 31 acts as an optical system and can view into the fuel tank 21 through the optical access window 28. The acquisition and elaboration section 32 comprises a processor and a memory.

The optical section 31 comprises a sample path 33 and a reference path 34. A light splitting module 36 directs light along the sample path 33 and the reference path 34. The light splitting module 36 is, for example, a beam splitter, an optical fibre coupler or a circulator. The light splitting module 36 is also configured to recombine light directed from the sample path 33 and the reference path 34.

The sample path 33 is directed into the fuel tank 21 through the window 28. Light travelling along the sample path 33 is directed through a lens 35. The lens 35 is a collimating lens in the present embodiments. The collimating lens generates a wide beam. This helps restrict the sensitivity of the OCT system 30 to disturbances at the fluid boundaries by increasing the imaged area. Alternatively, a diverging lens may be used to generate a diverging beam. An advantage of the diverging beam is that the imaged area may be increased. An advantage of the collimating lens is that the quantity of reflected light may be maximised whilst providing a suitable imaged area to restrict boundary disturbance sensitivities.

In the present embodiment, the lens 35 is disposed outside the fuel tank 21 to restrict contamination. However, the lens 35 may be disposed on the fuel tank side of the optical access window 28, or may replace or be formed as part of the optical access window 28. The lens 35 may be a single lens or two or more lenses.

In FIG. 2, the sample path 33 extends centrally and is pointed directly down towards the liquid surface in the fuel tank 21, although the arrangement in the fuel tank 21 may differ. The sample path 33 directs light into the fuel tank 21 and acquires reflected light in the fuel tank 21. Light directed into the fuel tank 21 is directed at the fuel surface 25. The light is scattered by the fluid in the fuel tank 21. A portion of the light is reflected back along the sample path 33.

The reference path 34 directs light to a reference mirror and directs the light reflected from the reference mirror. The sample path 33 directs light from the light splitting module 36 into the fuel tank 21 and directs reflected light from the fuel tank 21 to the light splitting module 36. The reference path 34 directs light from the light splitting module 36 to a reference mirror and directs the light reflected from the reference mirror to the light splitting module 36.

Light is directed to the light splitting module 36 from a light source 37. In the embodiment shown in FIGS. 2 and 3, the light source 37 is a swept laser light source. The swept laser light source, acting as the light source 37 is swept over a defined wavelength range. Light is transmitted by optical-fibre.

The OCT system 30 is based on an interferometer arrangement, in particular a Michelson interferometer. Alternative interferometric systems may be used, for example a Fizeau interferometer. Light is received from the light source 37. The light from the light source 37 is directed along both the sample path 33 and the reference path 34 by the light splitting module 36. Reflected light from the sample path 33 and reference path 34 is recombined by the light splitting module 36.

Recombined light from the light splitting module 36 is directed to an optical detector 38. In the embodiment shown in FIGS. 2 and 3, the optical detector 38 is a photodetector, for example a photodiode. The interaction between the reflecting light from the sample path 33 and the reference path 34 generates interference depending on the path difference. The optical detector 38 detects the intensity of the recombined beam. By sweeping the laser wavelength an interference spectrum pattern is generated in the wavelength domain.

The output from the optical detector 38 is captured using the elaboration module 39 of the image acquisition and elaboration section 32. The elaboration module 39 may be defined by the processor. A controller 40 is configured to control the sweeping of the laser wavelength. The controller 40 is also configured to control the acquisition of the light by the optical detector 38, and to synchronise with the output of the light source 37. The controller 40 may be defined by the processor. The output of the elaboration module is recorded, typically by the memory.

The interference spectrum acquired by the elaboration module 39 is analysed using a Fast Fourier Transform (FFT) to obtain a depth profile of the fluid in the fuel tank 21. Therefore, an analysis of each fluid boundary in the fuel tank 21 is able to be obtained.

An estimation of the fuel surface height (along with the attitude, volume and mass of the fuel) is determined by the elaboration module 39. The algorithm used by the elaboration module 39 will now be described.

As shown in FIG. 2, the fuel has the top surface 25 which defines a liquid fuel/air boundary. A refractive index change is defined at the liquid fuel/air boundary. Similarly, a refractive index change is defined at the liquid fuel/bottom wall boundary. Light is reflected at each refractive index change. The light emitted from the light source 37 is transmitted by the optical section 31 to illuminate the liquid fuel 24. In particular, an imaged area 41 is defined at the top surface 25 of the fuel. It will be understood that a proportion of the light is able to travel through the fluid to be reflected by a refractive index change at a boundary below the top surface.

Similarly, an imaged area 42 is defined at the bottom wall 23. This is defined by the liquid fuel/bottom wall boundary. A reflective surface may be provided at the bottom wall 23 in the region of the imaged area 42 to improve the signal to noise ratio. The top surface 25 of the fuel 24 is approximately horizontal in the shown example, but may have a non-planar shape due to ripple and slosh caused by motion of the aircraft. This movement and alterations in attitude is compensated for by providing a wide beam by use of the collimating lens 35.

The elaboration module 39 is programmed to analyse the interference pattern generated to determine a height of the edge of the surface of the liquid as follows. Firstly, the interference pattern acquired by the optical detector 38 is analysed using a Fast Fourier Transform to generate the depth profile.

The elaboration module 39 is configured to identify one or more step change in the refractive index along the sample path 34 as determined by the depth profile. Each step change in the refractive index is identified by a peak in the intensity of the reflected light at a position along the depth profile.

The signal at the optical detector 38 is a maximum if the path difference is an integral number of wavelengths and a minimum if it is an odd number of half wavelengths. Thus, the detector output will oscillate as the wavelength is scanned. The greater the path difference, the faster the output will oscillate. The spectrum will therefore have a ripple, the frequency of the ripple increasing with the path difference between the reference and the reflecting surface in the tank. Taking the Fourier transform of the spectrum (in wavenumbers) gives a set of peaks corresponding to each reflecting surface. The path difference in cm is the reciprocal of the peak separation in the spectrum (in cm$^{-1}$). The depth profile output of the FFT is an intensity vs depth profile, and each peak corresponds to a fluid boundary, and/or the fuel tank boundary.

Once the position of the intensity peak in depth profile is identified for the or each fluid boundary, then a height, hi from the top of the fuel tank to the top surface 25 can be determined. The boundary between the fuel tank 21 and the fluid in the fuel tank 21 along the sample path 34 is also determined by the elaboration module 39. As such, a height, $h_2$, of the top surface 25 in the fuel tank 21 to a determined portion of the fuel tank 21 can be determined. In the present embodiment, the length of the reference path 34 corresponds to the length of the sample path 33 to the top wall of the fuel tank 21. As such, in the present embodiment, the measured path difference corresponds to the depth of the boundary, i.e. the top surface 25 of the liquid fuel. The height of the fuel in the fuel tank 21 may be determined by reference to a predetermined reference point, or by reference to the determined distance between the determined position of the top surface 25 and a determined position of the fuel tank 21. The height of the fuel is therefore determined by the elaboration module 39.

The position of the or each boundary may be determined by reference to, for example, a look-up table in which the expected sequence of the boundaries, and/or parameters of the boundary, for example light intensity are stored.

Referring to FIG. 3, it will be appreciated that the depth profile of boundaries between two or more stratified fluids in the fuel tank 21 may be determined by the elaboration module 39. The elaboration module 39 is configured to identify each step change in the refractive index along the sample path 34 by analysis of the determined depth profile. Each step change in the refractive index is identified by a peak at a position along the depth profile. For example, in FIG. 3 the fuel tank is shown containing the liquid fuel 24 with its top surface 25, and liquid water 26 with stratified liquid boundary 27 defined at the liquid water/liquid fuel boundary. The imaged area 41 of the top surface 25 along the sample path 33 is shown, together with an imaged area 43 of the stratified liquid boundary 27. Upon analysis of the depth profile, the height between the top surface 25 and the stratified liquid boundary 27 is determined by the elaboration module 39. As such, it is possible for the OCT system to determine the height of fuel in the fuel tank 21 whilst taking into account stratified water in the fuel tank 21.

This process can be used by the elaboration module 39 to estimate the volume/mass of fuel in a fuel tank which is not a parallelepiped, as long as the geometry of the tank is known. In such a case the volume of fuel can be estimated from the heights of the fuel surface based on a look-up table, a neural network, or a computer model of the tank geometry. In one embodiment, the OCT system 30 is configured to determine the density of the fluid by calibrating the peaks in the depth profile against known densities.

Figure 4:
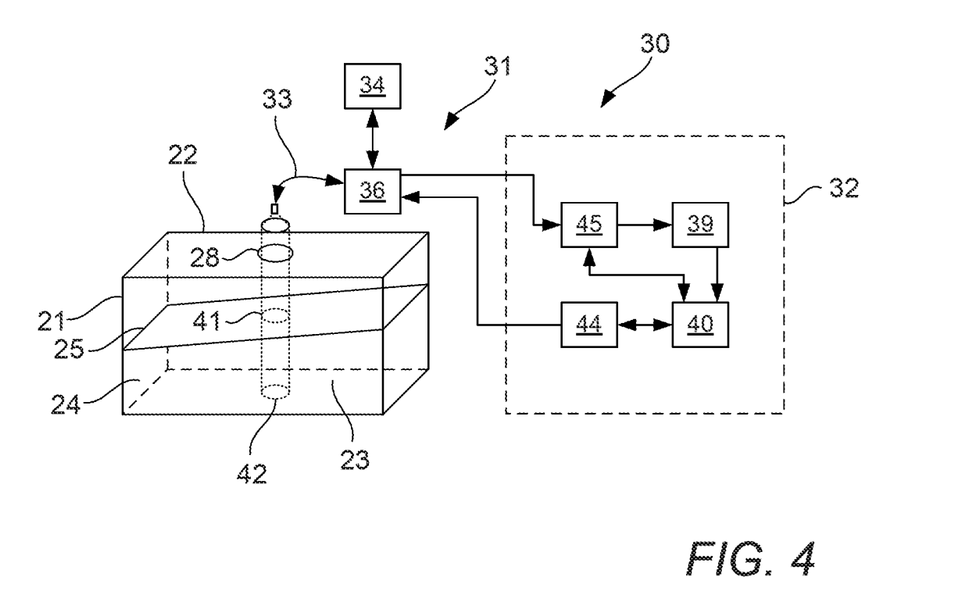
FIG. 4 shows the aircraft fuel tank of FIG. 1 with an alternative optical coherence tomography based system employing a broadband light source.

FIG. 4 shows an alternative embodiment of the OCT system 30 shown in FIG. 2 and FIG. 3. This embodiment is generally identical to the OCT system 30 shown in FIGS. 2 and 3 and so a detailed description will be omitted herein. Features of the embodiment shown in FIG. 4 corresponding to those shown in FIG. 2 and described above are generally the same and are provided with the same reference numbers.

However, in the embodiment shown in FIG. 4, a broadband light source 44 is provided as the light source, and a spectrometer 45 is provided as the optical detector 38. The spectrometer 45 detects the interference spectrum pattern. The interference spectrum pattern is in the wavelength domain. In this embodiment, the spectral components from the broadband light are analysed simultaneously using the spectrometer 45.

Figure 5:
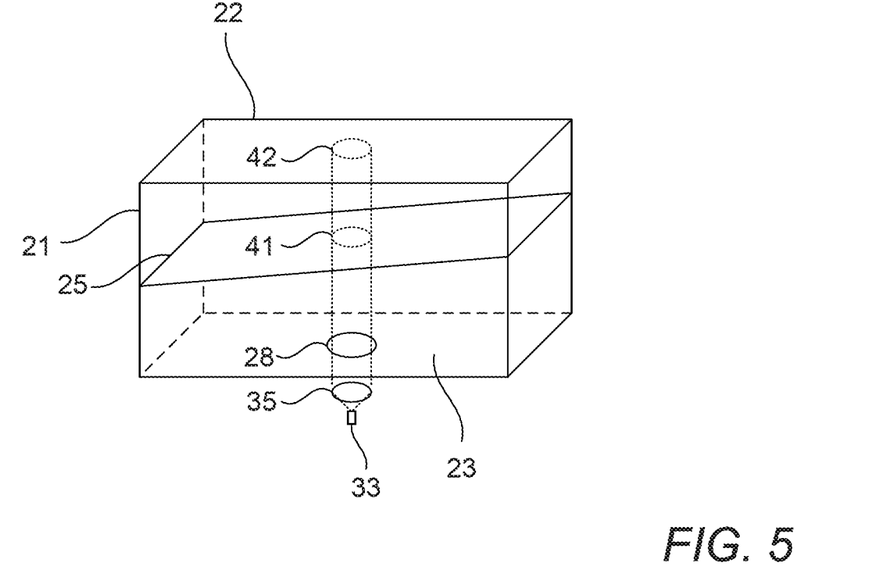
FIG. 5 shows an alternative arrangement to that shown in FIG. 2 in which the optical coherence tomography based system for measuring fuel in the fuel tank is positioned at a lower side of the aircraft fuel tank.

FIG. 5 shows an alternative embodiment of the OCT systems 30 shown in FIGS. 2, 3 and 4. This embodiment is generally identical to the OCT system 30 shown in FIGS. 2 and 3 and so a detailed description will be omitted herein. Features of the embodiment shown in FIG. 5 corresponding to those shown in FIG. 2 and described above are generally the same and are provided with the same reference numbers.

In the embodiment shown in FIG. 5, the sample path 34 is directed into the fuel tank 21 from a lower end of the fuel tank 21. That is, the window 28 is provided in the bottom surface 23 of the fuel tank 21. The OCT system 30 of any of the embodiments described above or below may be used.

Figure 6:
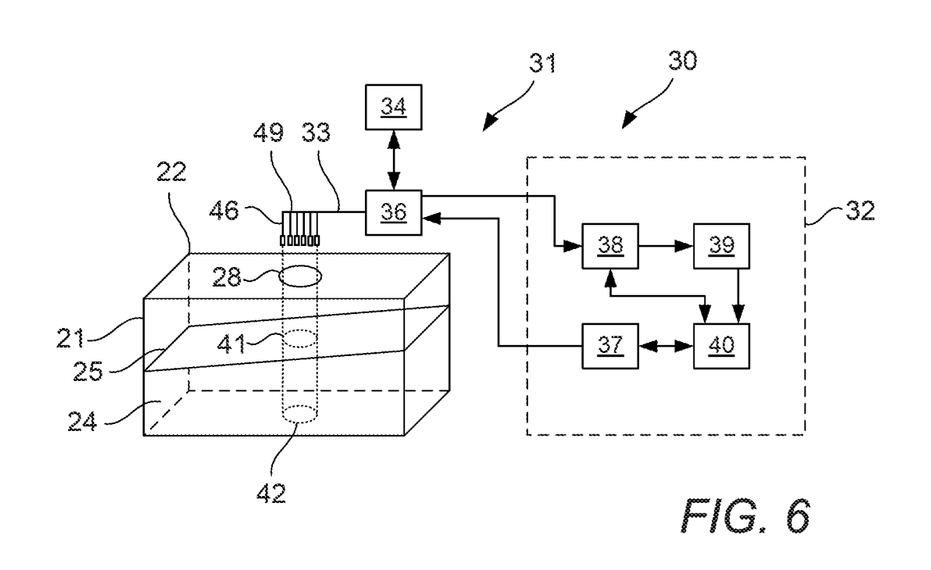
FIG. 6 shows an alternative arrangement to that shown in FIG. 2 in which the optical coherence tomography based system for measuring fuel in the fuel tank comprises an array of optical measurement points.

FIG. 6 shows an alternative embodiment of the OCT systems 30 shown in FIGS. 2, 3, 4 and 5. This embodiment is generally identical to the OCT system 30 shown in FIGS. 2 and 3 and so a detailed description will be omitted herein. Features of the embodiment shown in FIG. 6 corresponding to those shown in FIG. 2 and described above are generally the same and are provided with the same reference numbers.

In the embodiment shown in FIG. 6, the optical section 31 comprises an array 46 of fibre channels 49. The fibre channels 49 are spaced from each other. Alternatively, a fibre bundle may be used. As such, the array 46 defines a broad illuminating area. Each fibre channel 49 may have an individual collimating lens. Each fibre channel 49 defines a projecting path in the fuel tank 21 such that the fluid in the fuel tank 21 is illuminated by each of the projecting paths. The projecting paths together define the sample path 33. The array 46 and light splitting module 36 act to split the light from the light source 37 into the multiple projecting paths. Reflected light passes along each fibre channel 49 to be analysed independently by the optical detector 38. As such, the elaboration module 39 analyses separate spectrum and applies an FFT to each one to obtain the different depth profiles. The optical detector may include two or more detector modules.

With the arrangement shown in FIG. 6, it is possible to determining a depth profile of fluid in the fuel tank at two or more positions in the fuel tank. The elaboration module 39 is configured to determine the surface attitude of the top surface 25 in dependence on the analysed differences between the depth profiles at two or more of the projecting paths defined by the array 46. As such, a single OCT system 30 is able to determine the attitude of the top surface 25 and so increase the accuracy of the determined fuel height. It is also possible for the controller 40 to take account of a non-planar fluid surface caused by wave and sloshing effects of fluid in the fuel tank 21 as a result of aircraft movement.

Figure 7:
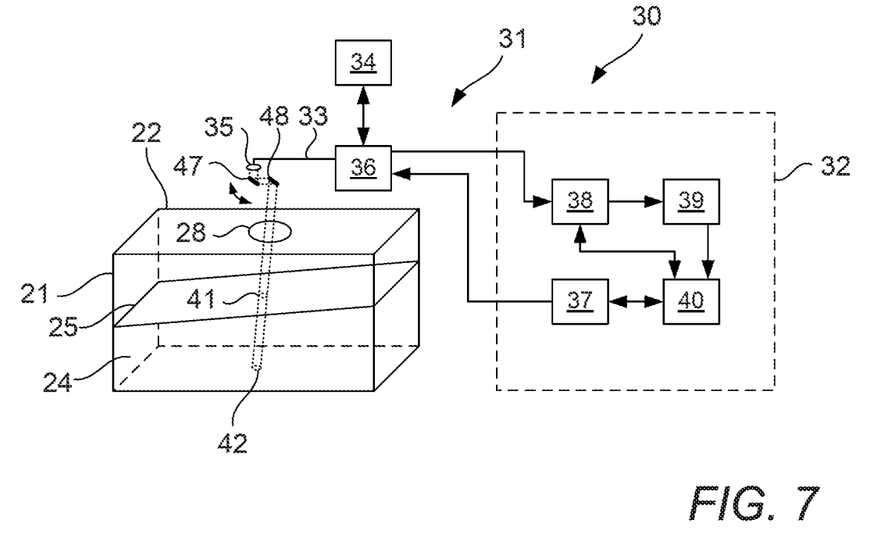
FIG. 7 shows an alternative arrangement to that shown in FIG. 2 in which the optical coherence tomography based system for measuring fuel in the fuel tank comprises a scanning mirror system.

FIG. 7 shows an alternative embodiment of the OCT systems 30 shown in FIGS. 2, 3, 4, 5 and 6. This embodiment is generally identical to the OCT system 30 shown in FIGS. 2 and 3 and so a detailed description will be omitted herein. Features of the embodiment shown in FIG. 7 corresponding to those shown in FIG. 2 and described above are generally the same and are provided with the same reference numbers.

In the embodiment shown in FIG. 7, the optical section 31 comprises a scanning mirror arrangement comprising a scanning mirror 47. The orientation of the scanning mirror 47 is adjusted by an actuator, for example a piezoelectric motor. The actuator is operated and controlled by the controller 40. The scanning mirror arrangement also has a fixed mirror 48. The scanning mirror arrangement is disposed along the sample path 33. The scanning minor arrangement is disposed between the lens 35 and the fuel tank 21. The scanning mirror 47 is rotatable about a pivot axis to adjust the sample path direction. As such, the scanning mirror arrangement is able to obtain a depth profile at different positions in the fuel tank 21. Alternative scanning mirror arrangements are anticipated.

With the arrangement shown in FIG. 7, it is possible to determining a depth profile of fluid in the fuel tank at two or more positions in the fuel tank. The elaboration module 39 is configured to determine the surface attitude of the top surface 25 in dependence on the analysed differences between the depth profiles at two or more positions as determined by adjusting the scanning mirror arrangement. As such, a single OCT system 30 is able to determine the attitude of the top surface 25 and so increase the accuracy of the determined fuel height. It is also possible for the elaboration module 39 to take account of a non-planar fluid surface caused by wave and sloshing effects of fluid in the fuel tank 21 as a result of aircraft movement.

With the embodiments shown in each of FIGS. 6 and 7, it is possible for the OCT system 30 to produce a 3D depth profile of part of the fuel tank.

Figure 8:
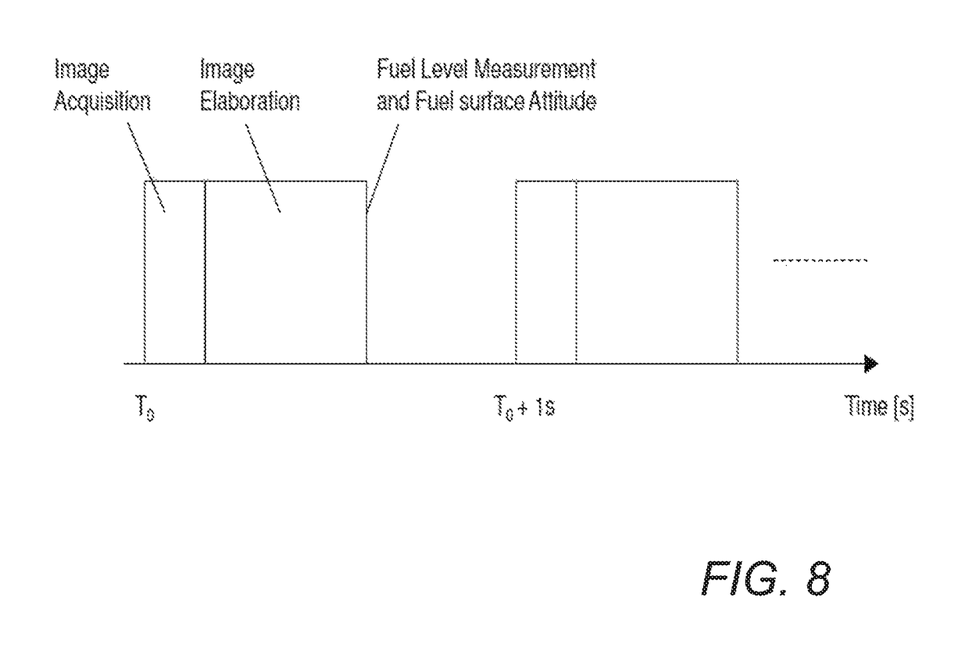
FIG. 8 shows a process for making a series of measurements.

The image acquisition and elaboration must be performed in real-time to allow a refresh time of the fuel quantity indication of is (1 Hz refresh rate) minimum as illustrated in FIG. 8. To allow this, a Digital Signal Processor (DSP) or similar high performance processors might be used for elements 39 and 40 in FIGS. 2, 4, 6 and 7.

FIG. 8 shows two measurements spaced apart by 1s.

Figure 9:
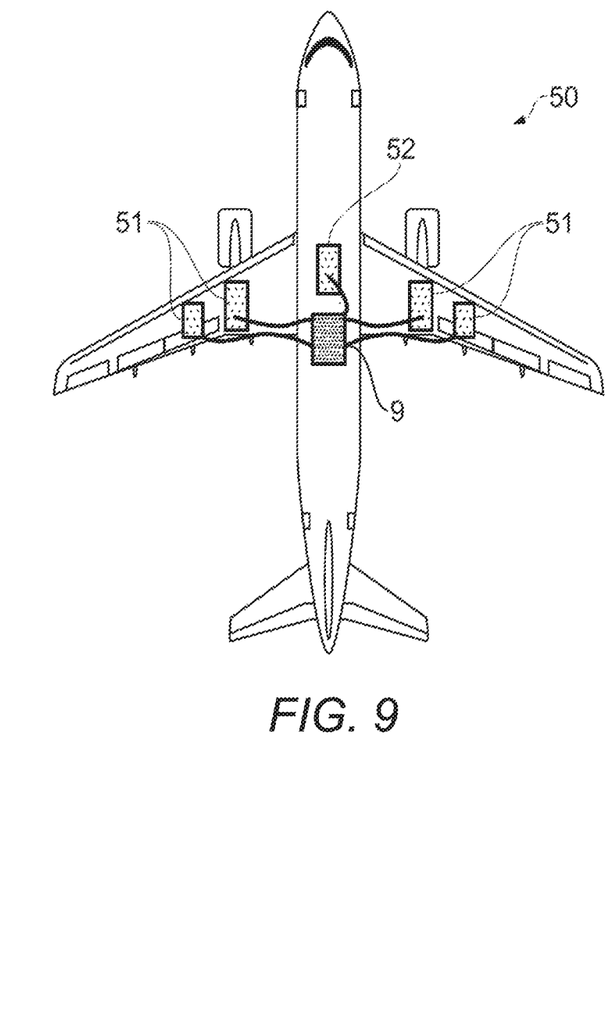
FIG. 9 shows an aircraft with a centralised processing architecture for monitoring fuel.

FIG. 9 is a plan view of an aircraft 50 incorporating the system of any of FIGS. 2, 4, 6 and 7. The aircraft has a wing fuel tank in each wing, and a centre fuel tank under the fuselage. Each fuel tank is divided into a number of bays, each bay being separate from an adjacent bay by a rib which has holes allowing fuel to move between the adjacent bays. FIG. 9 shows two bays 51 of each wing fuel tank and a single bay 52 of the centre fuel tank. Each one of the five bays has an optical section 31. In the architecture of FIG. 9 each optical fibre bundle leads to a single centralised image elaboration and elaboration section 9 in a pressurised and conditioned area.

Figure 10:
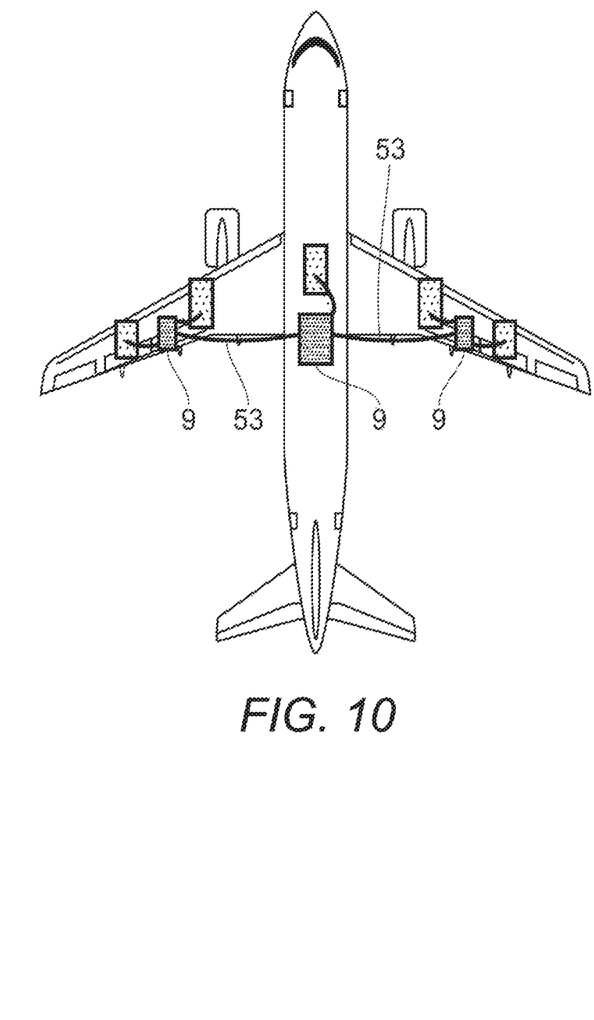
FIG. 10 shows an aircraft with a distributed processing architecture for monitoring fuel.

FIG. 10 shows an alternative localised architecture in which three image elaboration and elaboration sections 9 are provided closer to the bays thus reducing the length of optical fibre bundle required. The elaborated data may be transferred to a central one of the sections 9 via an electrical or optical communication network 53.

With the above described embodiments, a height measurement accuracy of 1 mm or below is possible. The OCT system 30 is also able to determine fuel having internal stratified layers of differing density.

Although the invention has been described above with reference to one or more preferred embodiments, it will be appreciated that various changes or modifications may be made without departing from the scope of the invention as defined in the appended claims.

The invention claimed is:

1. A method of determining a height of liquid in an aircraft fuel tank, the method comprising:
   illuminating the liquid in the aircraft fuel tank,
   detecting reflected light from the liquid, and
   using optical coherence tomography to determine a depth profile of the liquid in the fuel tank, and
   determining a height of the liquid in the fuel tank based on the determined depth profile.

2. The method according to claim 1, wherein the liquid is a liquid fuel.

3. The method according to claim 1, wherein the method comprises analysing the depth profile to identify a gas/liquid boundary in the fuel tank, and determining the height of the liquid in the fuel tank in dependence on the determined gas/liquid boundary.

4. The method according to claim 3, wherein the method comprises analysing the depth profile to identify a tank/liquid boundary, and the determining the height of the liquid in the fuel tank depends on the determined gas/liquid boundary and the tank/liquid boundary.

5. The method according to claim 3, wherein the method comprises analysing the depth profile to identify a liquid fuel/water boundary, and the determining the height of the liquid in the fuel tank depends on the determined gas/liquid boundary and the liquid fuel/water boundary.

6. The method according to claim 1, wherein the method comprises determining an interference spectrum pattern in the wavelength domain of the reflected light, and analysing the interference spectrum pattern to determine the depth profile of the liquid in the fuel tank.

7. The method according to claim 6, wherein the method comprises applying a Fast Fourier Transform to the interference spectrum pattern to determine the depth profile of the liquid in the fuel tank.

8. The method according to claim 6, wherein the method comprises directing light from a light source along a sample path into the fuel tank to illuminate the liquid and directing the reflected light from the fuel tank to an optical detector.

9. The method according to claim 8, wherein the method comprises directing light from the light source along a reference path split from the sample path, and recombining the light from the reference path with the reflected light from the fuel tank to generate the interference spectrum pattern.

10. The method according to claim 8, wherein the method comprises using a swept laser source as the light source and a photodetector as the detector, or using a broadband light source as the light source and a spectrometer as the detector.

11. The method according to claim 1, wherein the method further comprises directing light illuminating the liquid in the fuel tank from a bottom side of the fuel tank.

12. The method according to claim 1, wherein
   the method comprises splitting light illuminating the liquid in the fuel tank into two or more projecting paths in the fuel tank, and
   determining the depth profile of the liquid in the fuel tank at two or more positions in the fuel tank.

13. The method according to claim 12, wherein the method comprises determining the attitude of a surface of the liquid in the fuel tank in dependence on the two or more depth profiles of the liquid in the fuel tank at two or more positions in the fuel tank.

14. The method according to claim 1, wherein the method comprises scanning light illuminating the liquid in the fuel tank across a portion of the fuel tank, and determining a depth profile of the liquid in the fuel tank at two or more positions in the fuel tank.

15. A fuel tank measuring apparatus for measuring a depth of a liquid in an aircraft fuel tank, the apparatus comprising an optical coherence tomography system including:
   a light source configured to illuminate the liquid in the aircraft fuel tank, and
   a detector configured to detect reflected light reflected from within the aircraft fuel tank,
   wherein the optical coherence tomography system is configured to analyse the reflected light using optical coherence tomography to determine a depth profile of the liquid in the fuel tank, and determine a depth of the liquid in the fuel tank based on the depth profile.

16. The apparatus according to claim 15, further comprising a display device arranged to receive and display an output from the optical coherence tomography system.

17. An aircraft fuel tank system comprising an aircraft fuel tank, and an optical coherence tomography system including:
   a light source configured to illuminate liquid in the aircraft fuel tank,
   a detector configured to detect reflected light reflected from within the aircraft fuel tank, and
   wherein the optical coherence tomography system is configured to analyse the reflected light using optical coherence tomography to determine a depth profile of the liquid in the fuel tank, and determining a height of the liquid in the fuel tank using the depth profile.

18. The system according to claim 17, wherein the aircraft fuel tank comprises a window, and the optical coherence tomography system is positioned outside the aircraft fuel tank and arranged to illuminate the liquid in the fuel tank and detect reflect light through the window.

19. The system according to claim 17, wherein the aircraft fuel tank comprises a reflector in the aircraft fuel tank which is configured to reflect the light illuminating the liquid in the aircraft fuel tank.

20. A method comprising:
   illuminating a fuel tank containing a liquid,
   detecting light reflected from within the fuel tank due to the illumination, and
   determining a depth profile of the liquid in the fuel tank by analyzing the detected light using optical coherence tomography.

21. The method of claim 20 further comprising determining depth of the liquid in the fuel tank using the depth profile.

22. The method of claim 20 wherein the illumination of the fuel tank includes projecting from or into one end of the fuel tank and towards a reflective surface at on opposite end of the fuel tank.

23. The method of claim 20 wherein the illumination of the fuel tank includes projecting light through a collimating lens which directs collimated light towards the fuel tank.

24. The method of claim 20 further comprising generating information indicating the depth profile of the liquid in the fuel tank and sending the information to a display device.

* * * * *